Dec. 15, 1931.  F. RIEBER  1,836,397

METHOD OF AND APPARATUS FOR LOCATING THE DIRECTION OF SOUND

Filed July 28, 1927

INVENTOR
Frank Rieber
BY
HIS ATTORNEY

Patented Dec. 15, 1931

1,836,397

UNITED STATES PATENT OFFICE

FRANK RIEBER, OF SAN FRANCISCO, CALIFORNIA

METHOD OF AND APPARATUS FOR LOCATING THE DIRECTION OF SOUND

Application filed July 28, 1927. Serial No. 209,083.

This invention relates to the reception of sound, and especially to a mode for determining its direction.

It is sometimes of great importance to locate the source of sound, as for example in connection with shipping at or near harbors. In such places, craft are numerous, and whistles and horns are commonly utilized for warning or for signaling between craft or between craft and piers or docks. Although in ordinary weather, the human ear can easily distinguish the direction of sound with a fair degree of accuracy, yet in obscured or foggy weather, the sound is so diffused that the location of the source by ordinary hearing is very difficult. Yet in such weather especially, it is of the greatest importance to determine the direction of the sound, for the pilot is handicapped by his inability to see, and must rely solely upon his sense of hearing for preventing collisions and staying on the right course.

It has been proposed in the past to utilize some form of directional sound pick-up device, such as a horn, or a reflector, which can be moved by the operator to explore the surrounding regions; and in fact directional pick-ups have been suggested in which a sound sensitive device, such as a microphone, is relied upon to transmit electrical impulses to a receiver. If necessary, an amplifier could be used to increase the volume of the signal.

Such schemes are obviously impractical. Ordinarily whistles or sirens or horns sound only for a limited period at a time. If the manipulator fails quickly to focus his pick-up device in line with the source he misses the signal entirely. Furthermore, the proper manipulation of the pick-up device depends a good deal upon the personal efficiency and effort of the manipulator.

It is one of the objects of my invention to make is possible to locate the direction of sound without it being necessary for a manipulator to explore the region where the sound source may be present.

It is another object of my invention to make it possible to indicate directly on a scale, the source of the sound, without the necessity of exploration.

Another object of my invention is to provide a sound locating device that is compact and readily installed in any desired location.

Another object is to make it possible to ascertain sound directions with a minimum of adjustment or attention by the operator.

Still another object is to make it possible to note the directions of several simultaneously arriving sounds.

It is a still further object of my invention to provide a device whereby the direction from which some one particular sound is arriving may be determined, and the effect of other sounds may be reduced to a negligible quantity.

My invention possesses many other advantages, and has other objects which may be made more easily apparent from a consideration of one embodiment of my invention. For this purpose I have shown a form in the drawings accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawings.

Figure 2:
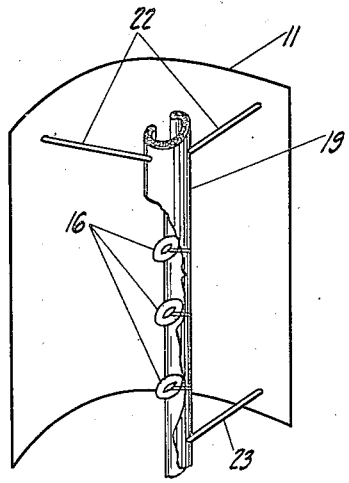
Fig. 2 is a diagrammatic perspective view, partly broken away, of one portion of said pick-up device.
Figure 1:
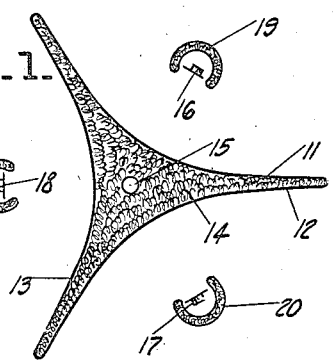
Figure 1 is a diagrammatic top plan view of a sound pick-up device that can be utilized in connection with my invention.

In Figs. 1 and 2 I illustrate one form of a sound pick-up device, which has definite advantages. There are one or more sound reflectors, 11, 12, and 13. Each can be made parabolic in form, to concentrate the sound reflected from it at a focal point; and they can be either paraboloids of revolution, or simply parabolic cylinders.

Although it would be entirely feasible to utilize but one reflector for the pick-up system, the plurality shown has advantages which will later become apparent. They can be arranged to have their axes disposed at equal angular spacings from each other, in a horizontal plane; thus the symmetrical three-sided figure shown in Fig. 1 is obtained. Sound deadening or padding material 14 can be used back of each reflector to prevent vibration from any source or from any of the adjacent surfaces, from reaching any of the reflecting surfaces.

I make it possible to rotate the pick-up system about a vertical axis, as for example, about the axis of vertical shaft 15, which supports the pick-up device. As this sytem is rotated, each of the reflectors 11, 12, and 13, will be subjected to sound waves, and if any of them happens to have its axis substantially alined with a source of sound, the waves emanating from that source will be concentrated adjacent the focus of the reflector. Sounds from other directions will not be concentrated at that point, and thus there is a directional effect which can serve for determining the locality of the source.

If we assume there is a source of sound, each reflector as it is alined with it, responds to these sounds. It is evident that in order to secure the same frequency of response with but one reflector, that one reflector would have to be rotated much faster than if a plurality of such reflectors are used. Thus the advantage of a plurality of reflectors 11, 12, and 13 grouped around an axis is that the speed of rotation can be much less than without such a series.

Furthermore, before discussing the details of operation more fully, it is best at this stage to consider the effect of a continuously rotating sound pick-up system. The continual rotation has the effect of successive exploration, the cycle being fast, so that even if a sound persists for only a second or so, the pick-up system will nevertheless respond thereto. Now if the pick-up system can cause a response in an indicator without appreciable lag, the relation of the time of this response to the position of the pick-up system will show the direction of the source. With my apparatus this rapid response can easily be obtained.

The sounds concentrated at the focal lines of the reflectors 11, 12, 13 can be used to influence translating devices, such as microphones 16, 17, 18, located most favorably for this purpose. These microphones can initiate electrical impulses in a system that is to be later described. They are furthermore, shielded as by absorbent shields 19, 20, 21, against extraneous sound waves or those not directly reflected from the reflecting surfaces.

In case the reflectors are cylindrical surfaces, more than one microphone or its equivalent can be used to pick up the sound waves along the whole length of the reflector. Such an arrangement is illustrated in Fig. 2, where there are three microphones 16 shown, arranged in a vertical series, in the focal line of reflector 11. The microphones can be directly supported on the shielding pad 19, which in turn can be held to the reflector structure by the supporting rods 22, 23.

Figure 3:
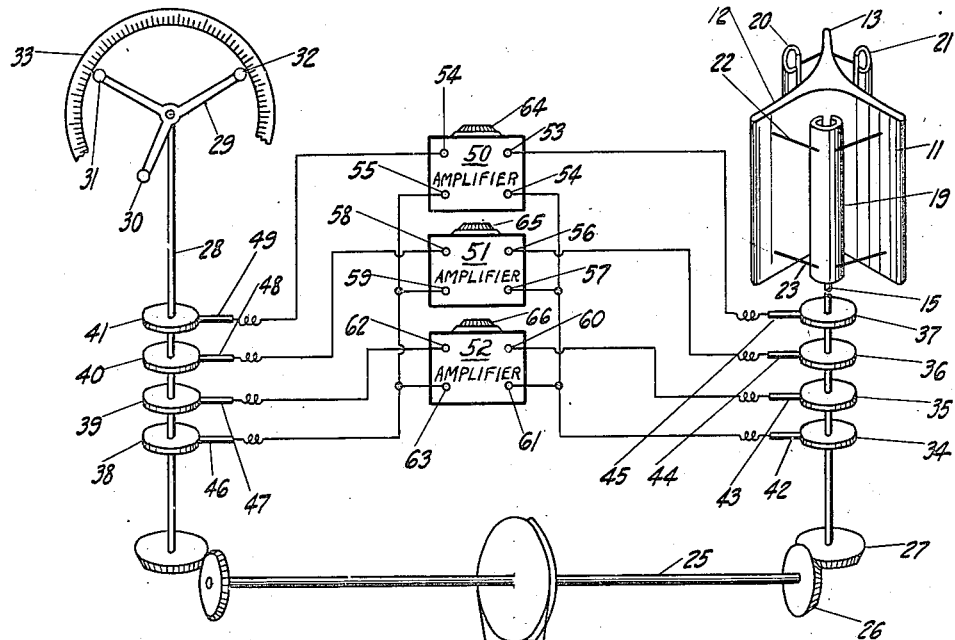
Fig. 3 is a wiring diagram showing a complete installation embodying my invention.

In Fig. 3 I show an entire operative system. The shaft 15, supporting the sound pick-up system is rotated by the aid of a motor 24, rotating shaft 25, and gearing 26 and 27. Shaft 25 is arranged to rotate in synchronism with another rotating structure, including a shaft 28, and a frame 29, which carries indicating lights 30, 31, 32. These lights are spaced around a circle similarly to the spacing of reflectors 11, 12, and 13; light 30 corresponding to reflector 11, and lights 31 and 32 corresponding respectively to the other two reflectors 12 and 13.

It is to be noted particularly that the radial positions of these lights correspond to the axes of their associated reflectors. Furthermore, the microphone structures 19, 20, and 21 are arranged to affect respectively, these lamps, so that when any of them are energized, the corresponding lamps are lit. Since these lamps rotate synchronously with the reflectors, it is evident that the position of the lamp that glow indicates which of the reflectors is receiving sound waves, and therefore the direction of the sound waves can be immediately determined by noting the position of the bright lamp on a scale 33. I prefer to use neon glow lamps for lights 30, 31, 32, since they have least inertia and respond rapidly to the picked-up sound waves.

The signals or indications perceived by noting the positions of the bright lamps are quite sharp, for the lamps are lit for only a small arc of their movement, corresponding to the restricted movement of its associated reflector during which it responds to the sound waves. Of course, the lamp is energized for a short time during each revolution; and the other lamps are also energized when their associated reflectors pick up the sound waves. Thus there are as many bright arcs produced per revolution, as there are reflectors on support 15. In case there are several sources of sound simultaneously active, several bright arcs per lamp per revolution would be produced, and the direction of each source can easily be noted on scale 33.

The electrical connections for the system are merely illustrated in a very general manner. Each microphone unit 19, 20, 21, has a pair of wires—one of the pair connecting to a common collector ring 34, and the others of the pair connecting to separate rings 35, 36, and 37. Similarly, each lamp 30, 31 and 32 has two wires, one of the two connecting to a common collector ring 38, and the others of the pair connecting to separate rings 39, 40 and 41. Collectors or brushes 42 to 49 bear on these rings. Due to this arrangement it is possible to connect between each microphone structure and its associated lamp, an amplifier system; and therefore I show rectangles 50, 51, 52 which diagrammatically represent such amplifier systems. These can be of the thermionic valve variety, and preferably multistage, so as to ensure brilliant illumination of lamps 30, 31 and 32 even for faint sounds. The rectangles 50, 51 and 52 can also represent the associated sources of electrical energy which are necessary to make the system operate.

Thus for example it can be assumed that amplifier 50 has its input terminals 53 and 54 connected to microphone structure 19; and its output terminals 54 and 55, to lamp 30. Similarly, the input terminals 56 and 57 of amplifier 51 can be connected to microphone structure 20; and the output terminals 58 and 59 to lamp 31. And finally, the input terminals 60 and 61 of amplifier 52 can be connected to microphone structure 21; and the output terminals 62 and 63 to the lamp 32.

It is evident that the indicating structure 29,—30—31—32—33 can be located at the most convenient place, as in a pilot house, even if the sound pick-up device is located elsewhere.

I claim:

1. In combination, a sound pick-up system, comprising a plurality of reflectors each having a focus, said reflectors having axes angularly displaced from each other, and forming a unitary structure, means for rotating said structure about an axis non-parallel to the axes of the reflectors, a device translating sound into electrical impulses arranged adjacent each focus, and an indicator device affected by said sound translating devices.

2. In combination, a plurality of parabolic reflectors, having axes angularly displaced from each other in a horizontal plane, forming a unitary structure, and means for rotating said structure about a vertical axis, a device translating sound into electrical impulses arranged adjacent the focus of each reflector, and an indicator device affected by said sound translating devices.

3. In combination, a plurality of sound pick-up devices angularly displaced from each other and each being directional, means for rotating the devices so that they are angularly moved about a common axis, a plurality of indicating devices, one for each sound pick-up device, said indicating devices being similarly angularly spaced as the sound pick-up devices, and each being affected by its corresponding pick-up device, means for rotating all the indicating devices in synchronism with the sound pick-up devices, and means providing a fixed reference point past which the indicating devices travel.

In testimony whereof I have hereunto set my hand.

FRANK RIEBER.